(12) United States Patent
Desai et al.

(10) Patent No.: US 10,645,192 B2
(45) Date of Patent: *May 5, 2020

(54) IDENTIFYING CONTENT FILES IN A CACHE USING A RESPONSE-BASED CACHE INDEX

(71) Applicant: Juniper Networks, Inc., Sunnyvale, CA (US)

(72) Inventors: Kiran Desai, Milpitas, CA (US); Jaspal Kohli, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 500 days.

This patent is subject to a terminal disclaimer.

(21) Appl. No.: 15/225,369

(22) Filed: Aug. 1, 2016

(65) Prior Publication Data

US 2016/0344842 A1 Nov. 24, 2016

Related U.S. Application Data

(63) Continuation of application No. 14/031,914, filed on Sep. 19, 2013, now Pat. No. 9,407,716.

(51) Int. Cl.
*H04L 29/08* (2006.01)
*G06F 16/957* (2019.01)
*G06F 16/172* (2019.01)

(52) U.S. Cl.
CPC .......... *H04L 67/327* (2013.01); *G06F 16/172* (2019.01); *G06F 16/9574* (2019.01); *H04L 67/2819* (2013.01); *H04L 67/2842* (2013.01)

(58) Field of Classification Search
CPC ............ H04L 67/2819; H04L 67/2842; H04L 67/327; H04L 67/28; H04L 67/32; G06F 17/30902; G06F 16/172
See application file for complete search history.

(56) References Cited

U.S. PATENT DOCUMENTS

| | | | |
|---|---|---|---|
| 5,752,251 A * | 5/1998 | Cripps | G06F 11/1443 |
| 7,133,984 B1 * | 11/2006 | Dickensheets | G06F 11/1004 711/162 |
| 7,827,147 B1 * | 11/2010 | D'Hoye | G06F 16/134 707/652 |
| 8,417,966 B1 * | 4/2013 | Mooneyham | H04L 9/3236 713/189 |
| 9,407,716 B1 | 8/2016 | Desai et al. | |
| 9,407,726 B1 | 8/2016 | He et al. | |

(Continued)

*Primary Examiner* — Aaron N Strange
(74) *Attorney, Agent, or Firm* — Harrity & Harrity, LLP

(57) ABSTRACT

A first device may receive a content request from a second device. The content request may include a dynamic network address and a request for a content file. The first device may determine that the dynamic network address is not included in a first index; determine one or more response values associated with the content file; determine that the one or more response values are included in a second index when the one or more response values match one or more response values included in the second index; generate an association between the dynamic network address and the second index to map the dynamic network address to the second index and to the content file based on determining that the one or more response values are included in the second index; and provide the content file to the second device.

20 Claims, 7 Drawing Sheets

(56) References Cited

U.S. PATENT DOCUMENTS

| | | | |
|---|---|---|---|
| 2002/0194313 A1* | 12/2002 | Brannock | G06F 8/65 709/220 |
| 2004/0098599 A1* | 5/2004 | Bentley | G06F 21/16 713/187 |
| 2005/0005107 A1 | 1/2005 | Touboul | |
| 2005/0021994 A1* | 1/2005 | Barton | G06F 21/562 726/26 |
| 2009/0271527 A1 | 10/2009 | Appleman | |
| 2012/0117201 A1 | 5/2012 | Arolovitch et al. | |
| 2012/0191804 A1 | 7/2012 | Wright et al. | |
| 2012/0221670 A1 | 8/2012 | Frydman et al. | |
| 2014/0025841 A1 | 1/2014 | Li et al. | |

* cited by examiner

| URI Index 410 | |
|---|---|
| URI | RBCI ID |
| URI 1 | RBCI 1 |
| URI 2 | RBCI 1 |
| URI 3 | RBCI 1 |
| URI 4 | RBCI 1 |
| URI 5 | RBCI 1 |
| URI 6 | RBCI 2 |
| URI 7 | RBCI 2 |
| URI 8 | RBCI 3 |
| URI 9 | RBCI 3 |
| URI 10 | RBCI 3 |

| RBCI Information 420 | | | |
|---|---|---|---|
| RBCI ID: RBCI 1 | | | |
| Content File Path: \directory\subdirectory\movie.mkv | | | |
| | URI List | Response Values | |
| | | Checksum | Date/Time Modified | Signature |
| | URI 1 | 4548E5742 | 1/1/2013 12:00 | hj87fhsx92 |
| | URI 2 | | | |
| | URI 3 | | | |
| | URI 4 | | | |
| | URI 5 | | | |
| Expiration: 1/8/2013 12:00 | | | |

Fig. 4

IDENTIFYING CONTENT FILES IN A CACHE USING A RESPONSE-BASED CACHE INDEX

RELATED APPLICATION

This application is a continuation of U.S. patent application Ser. No. 14/031,914, filed Sep. 19, 2013 (now U.S. Pat. No. 9,407,716), which is incorporated herein by reference.

BACKGROUND

A service provider is an entity (e.g., a business or an organization) that sells bandwidth provided by a network (e.g., the Internet, a data network, a telecommunications network, etc.) associated with the service provider. Service providers may include telecommunications companies, data carriers, wireless communications providers, Internet service providers, cable television operators offering high-speed Internet access, etc. The rapid growth in the use of content, such as, for example, video, audio, images, and software downloads, is creating much higher bandwidth demands on service providers, with sharp bandwidth peaks that may be due to suddenly popular content or the occurrence of certain events.

In order to address such higher bandwidth demands, service providers deploy proxy cache devices, such as, cache servers, in their networks. The cache servers can cache popular content, which enables the service providers to optimize network utilization and to save on backhaul bandwidth costs. The cache servers may be associated with network devices (e.g., routers) that interconnect client devices requesting content (e.g., via a universal resource identifier, such as a web link) and origin devices storing the requested content.

If a request is for content that is stored in the cache server, then the cache server provides the content to the client device. If the requested content is not stored in the cache server, then the cache server connects to the origin device and requests the content from the origin device. The cache server provides the content received from the origin device to the client device, and may cache the content for future use.

SUMMARY

According to some possible implementations, a method may include receiving, by a first device, a content request from a second device. The content request may include a dynamic network address and a request for a content file corresponding to the dynamic network address. The method may further include determining, by the first device, that the dynamic network address is not included in a first index that stores multiple different dynamic network addresses; determining, by the first device, one or more response values, associated with the content file, based on determining that the dynamic network address is not included in the first index; and determining, by the first device, that the one or more response values are included in a second index when the one or more response values match one or more response values included in the second index. The second index may identify that the content file is being stored by the first device. The method may include generating, by the first device, an association between the dynamic network address and the second index to map the dynamic network address to the second index and to the content file based on determining that the one or more response values are included in the second index; and providing, by the first device, the content file to the second device.

According to some possible implementations, a system may include a first device to receive a content request from a second device. The content request may include a dynamic network address and a request for a content file corresponding to the dynamic network address. The first device may determine that the dynamic network address is not included in by a first index that includes multiple different dynamic network addresses. Multiple network addresses, of the multiple different network addresses, may correspond to a same, particular content file. The first device may determine one or more response values, associated with the content file based on determining that the dynamic network address is not included in the first index; and determine whether the one or more response values are being stored by a second index based on whether the one or more response values match one or more response values included in the second index. The second index may whether the content file is being stored by the first device. The first device may generate an association between the dynamic network address and the second index to map the dynamic network address to the second index and to the content file based on determining that the one or more response values are included in the second index; generate a third index to map the dynamic network address to the third index and to the content file based on determining that the one or more response values are not included in the second index; and provide the content file to the second device According to some possible implementations, a computer-readable medium for storing instructions may include: multiple instructions which, when executed by one or more processors associated with a first device, cause the one or more processors to receive a content request from a second device. The content request may include a dynamic network address and a request for a content file corresponding to the dynamic network address. The multiple instructions may further cause the one or more processors to determine whether the dynamic network address is included in a first index that includes multiple different dynamic network addresses; determine one or more response values, associated with the content file based on determining that the dynamic network address is not included in the first index; and determine that the one or more response values are included in a second index when the one or more response values match one or more response values included in the second index. The second index may identify that the content file is being stored by the first device. The multiple instructions may further cause the one or more processors to generate an association between the dynamic network address and the second index to map the dynamic network address to the second index and to the content file based on determining that the one or more response values are included in the second index; and provide the content file to the second device based on determining that the one or more response values are included in the second index or determining that the dynamic network address is included in the first index.

BRIEF DESCRIPTION OF THE DRAWINGS

FIG. 4 illustrates an example data structure that may be stored by one or more devices in the environment of FIG. 2;

DETAILED DESCRIPTION

The following detailed description refers to the accompanying drawings. The same reference numbers in different drawings may identify the same or similar elements.

A dynamic network address (e.g., a dynamic uniform resource identifier (URI), a dynamic uniform resource locator (URL), or the like) may be generated by an origin device, storing a content file (e.g., a video file, an audio file, an image file, a text file, an application file, or some other computer file), when a client device requests the content file (e.g., via a link on a web page). Another dynamic network address may be generated by the origin device when another client device requests the same content file. Thus, multiple different dynamic network addresses may correspond to a particular content file. As a result, the cache server may store multiple copies of the particular content file when indexing content based on URIs, thereby consuming storage space on the cache server.

Systems and/or methods, as described herein, may cache a content file that is stored by an origin device and is identified via a dynamic network address in a manner that prevents multiple copies of a particular content file from being cached. For example, a cache server may include a response-based cache index (RBCI) the maps response values to a particular content file. In some implementations, the response values may include metadata associated with the particular content file (e.g., a last modified date and/or time, a content length value, etc.), a signature (e.g., an entity tag (etag)), a checksum value, and/or some other information that uniquely identifies the particular content file. In some implementations, the RBCI may be mapped to multiple dynamic network addresses such that a single instance of the particular content file may be mapped to the multiple dynamic network addresses. In some implementations, additional dynamic network addresses may later be mapped to the particular content file when response values, corresponding to the additional dynamic network addresses, match response values associated with the particular content file.

While the systems and/or methods will be described as caching a content file that is identified based on a dynamic URI, in practice, the systems and/or methods may cache a content file that is identified based on some other type of dynamic network address.

Figure 1:
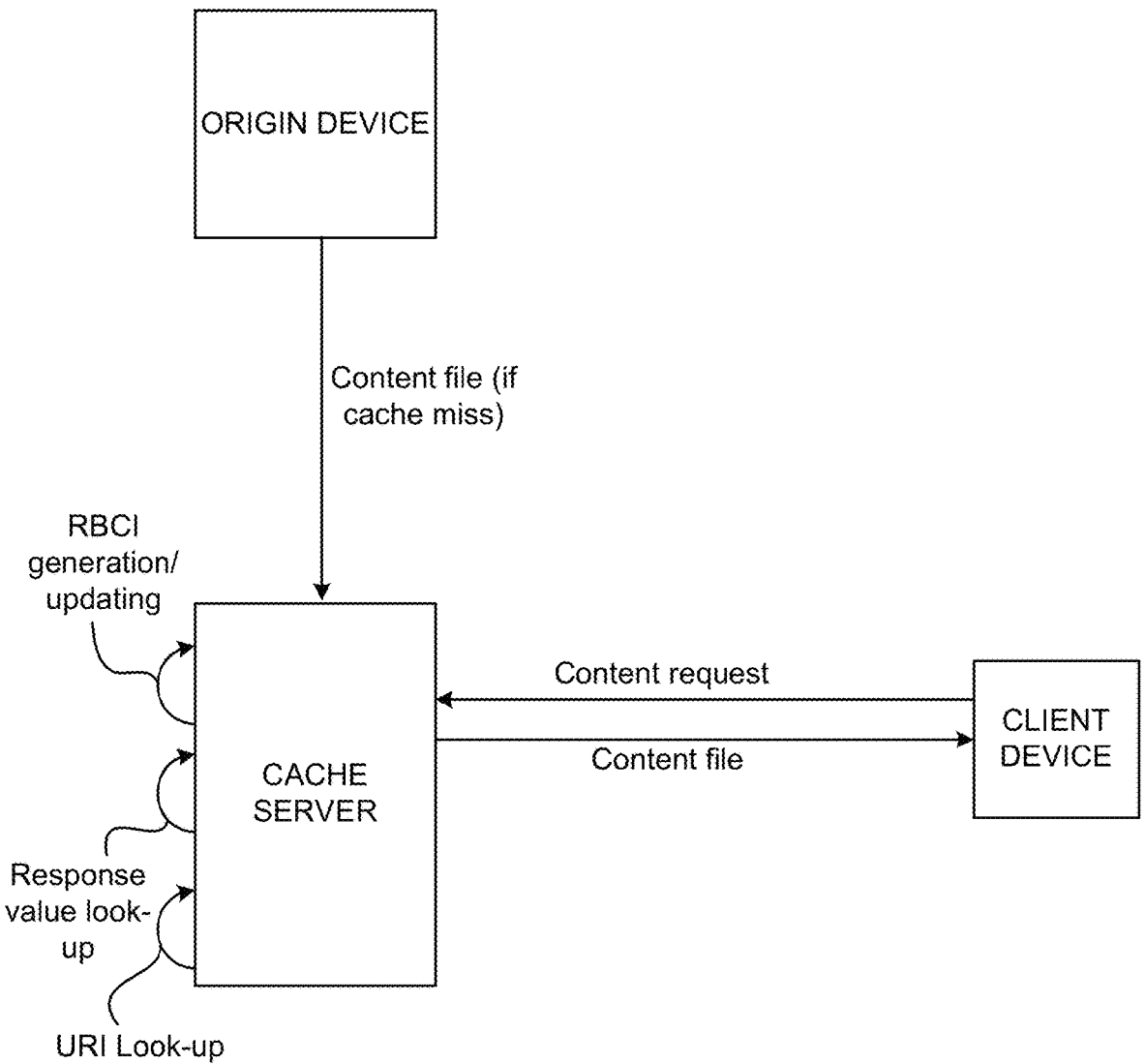
FIG. 1 illustrates an example overview of an implementation described herein.

FIG. 1 illustrates an example overview of an implementation described herein. As shown in FIG. 1, a client device may provide a content request (e.g., corresponding to a link in a web page, a network address, or some other type of content identifier) to request a content file stored by an origin device. In some implementations, the content request may include a dynamic URI. In some implementations, a cache server may receive the content request, and may look up the URI in a URI index. If the URI is present in the URI index (e.g., a cache-hit), the cache server may provide the content file, corresponding to the URI, without communicating with the origin device (e.g., since the cache server stores the content file).

If, on the other hand, the URI is not present in the URI index, the cache server may determine response values, associated with the content file, and look up the response values in RBCIs corresponding to content files stored by the cache server. If the response values, associated with the content file, are in an RBCI (e.g., a cache-hit), the cache server may provide the content file, corresponding to the response values and the RBCI, without communicating with the origin device. Further, the cache server may update the RBCI by mapping the URI to the RBCI and the content file, such that when a subsequent content request, including the URI, is received, the cache server may determine a cache-hit and provide the content file without communicating with the origin device.

If, on the other hand, the response values, associated with the content file, are not in an RBCI (e.g., a cache-miss), the cache server may receive the content file from the origin device, determine response values of the content file, generate an RBCI for the content file, and map the response values and the URI to the content file in the RBCI. When a subsequent content request is received by the cache server and the URI, included in the subsequent content request is not present in the URI index, but the response values, associated with the content file in the subsequent content request, match response values stored by the RBCI for the content file, the cache server may determine a cache-hit and deliver the content file without communicating with the origin device.

As a result, the cache server may store a single instance of a content file when multiple different URIs correspond to the content file. Further, the cache server may determine a cache-hit or a cache-miss based on RBCIs that map response values to content files and map multiple different URIs to one set of response values and one content file. In some implementations, the cache server may avoid communicating with the origin device based on determining a cache-hit. Further, as additional URIs, corresponding to a particular content file, are discovered (e.g., by mapping the URIs to response values for the particular content file), the more likely the cache server may determine a cache-hit based on the URI, without storing multiple instances of the particular content file, thereby simplifying the caching of content files and reducing storage consumption in relation to when multiple instances of the particular content file are stored. Further, since a particular URI can be mapped to a particular RBCI (and hence a particular content file,) a client device can provide multiple requests using the particular URI (where each request includes the particular URI and a byte range, corresponding to a request for a portion of the content file), such that each portion of the content file does not need an RBCI (since the particular URI maps to the RBCI of the entire content file).

Figure 2:
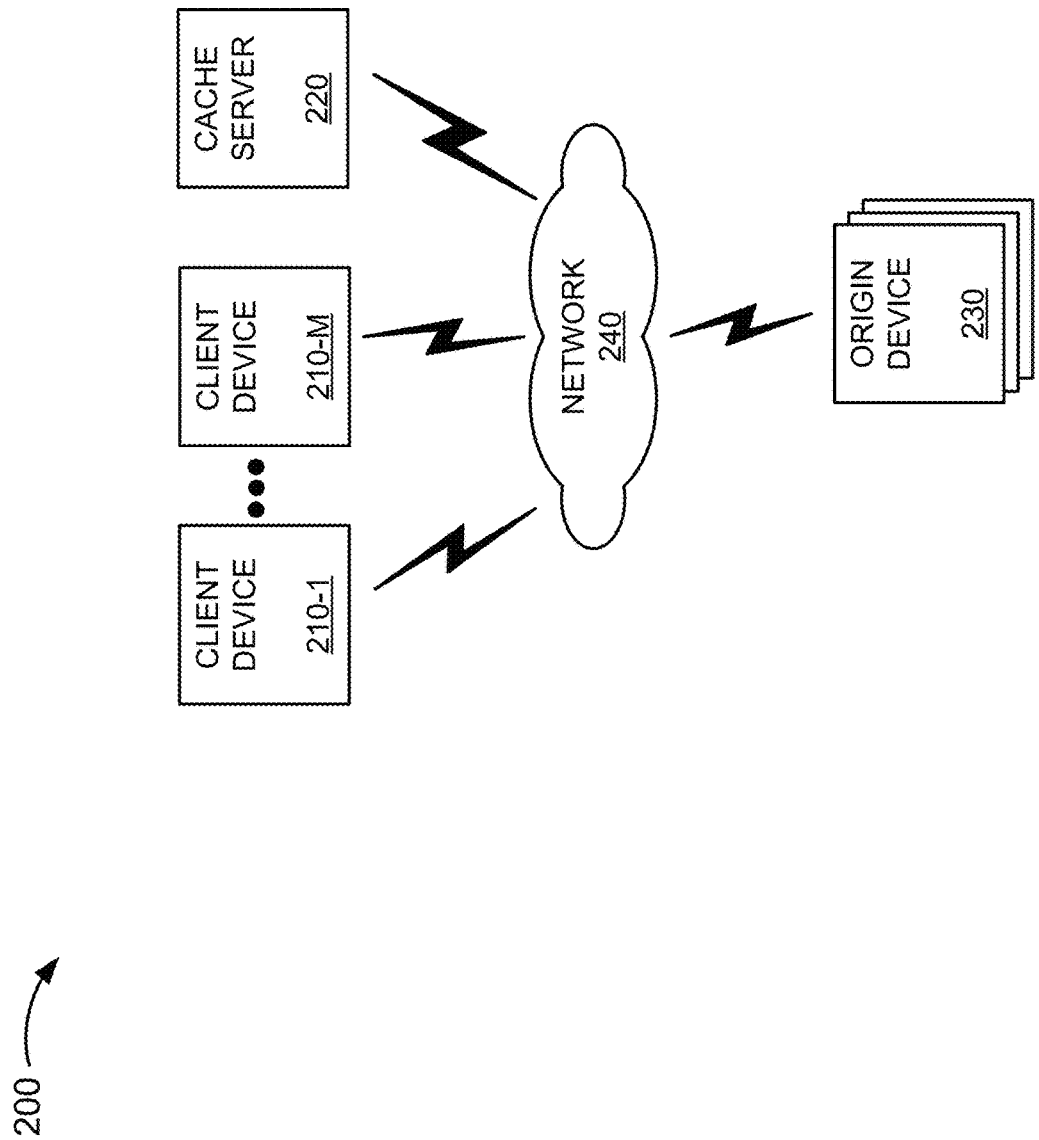
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1, . . . , 210-M (where M≥1), cache server 220, origin device 230, and network 240.

Client device 210 may include a device capable of communicating via a network, such as network 240. For example, client device 210 may correspond to a mobile communication device (e.g., a smart phone or a personal digital assistant (PDA)), a portable computer device (e.g., a laptop or a tablet computer), a gaming device, a desktop computing device, etc. In some implementations, client device 210 may communicate with origin device 230 (e.g., via cache server 220) to request and receive a content file.

Cache server 220 may include one or more computing devices, such as a server device or a collection of server devices. In some implementations, cache server 220 may receive a content file from origin device 230, store the content file, and maintain a cache index to identify the stored content file for delivery to client device 210 (e.g., on behalf of origin device 230). Additionally, or alternatively, cache server 220 may direct origin device 230 to provide a content file to client device 210 (e.g., when client device 210 requests the content file and the content file is not stored by cache server 220). In some implementations, cache server 220 may determine a response value based on data associated with a content file and may store the response value for a corresponding content file in an RBCI.

Origin device 230 may include one or more computing devices, such as a server device or a collection of server devices. In one example implementation, origin device 230 may include content files that may be accessed by client device 210 via network 240. Additionally, or alternatively, origin device 230 may provide particular content files to cache server 220 for storage. Cache server 220 may store the particular content files so that cache server 220 may provide the particular content files to client device 210, when requested by client device 210, and without involving origin device 230. In some implementations, origin device 230 may identify a content file based on a dynamic URI. In some implementations, the content file may include a signature, such as an entity tag (etag) including information that uniquely identifies the content file, a last modified date and/or time, a content length value, a response header, elements of metadata, and/or some other information that uniquely identifies the content file.

Network 240 may include one or more wired and/or wireless networks. For example, network 240 may include a local area network (LAN), a wide area network (WAN), a metropolitan network (MAN), a telephone network (e.g., the Public Switched Telephone Network (PSTN) or a cellular network), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
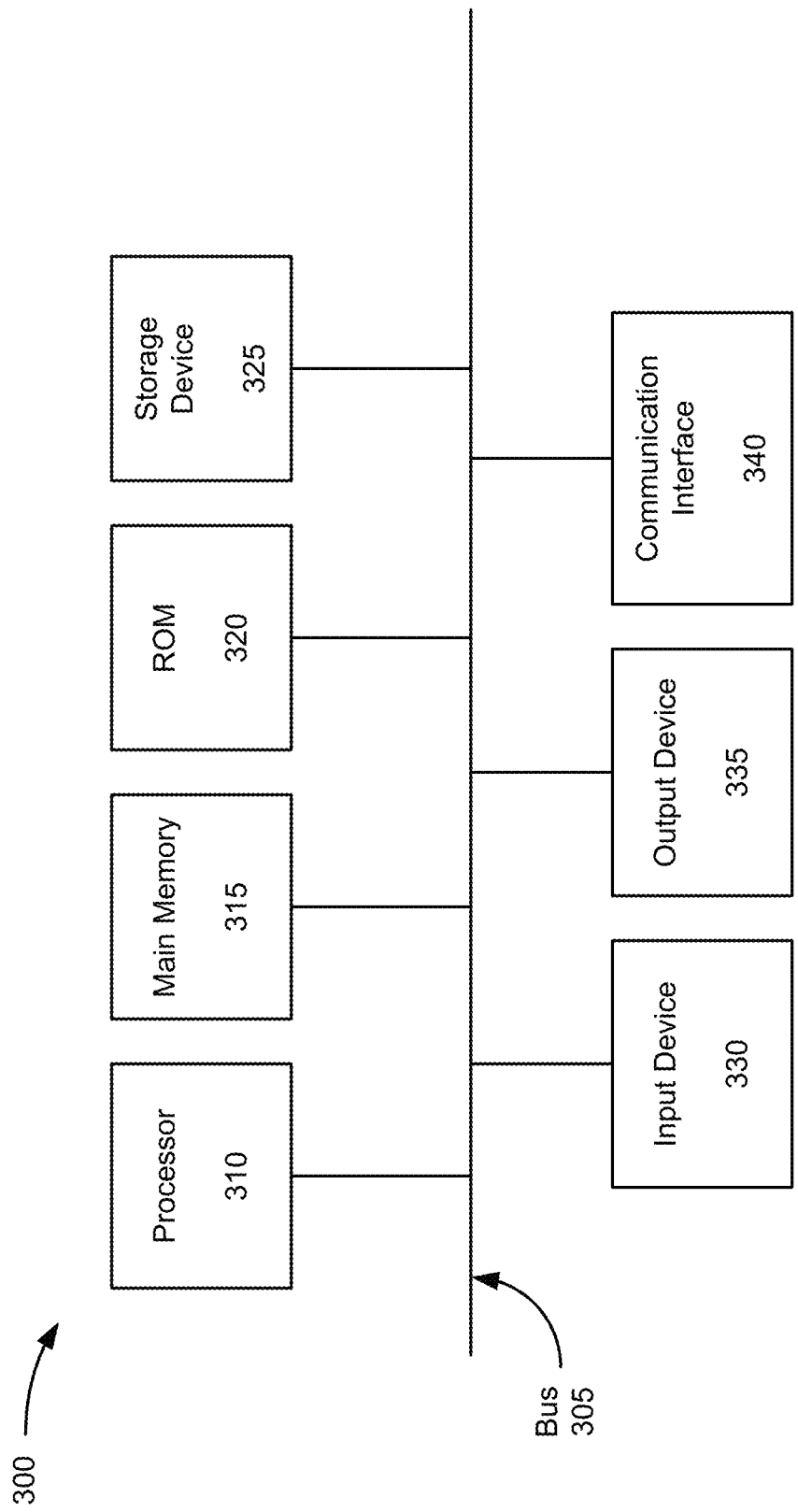
FIG. 3 illustrates example components of a device that may be used within the environment of FIG. 2.

FIG. 3 illustrates example components of a device 300 that may be used within environment 200 of FIG. 2. Device 300 may correspond to client device 210, cache server 220, or origin device 230. Each of client device 210, cache server 220, or origin device 230 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

FIG. 4 illustrates an example data structure 400 that may be stored by one or more devices in environment 200, such as cache server 220. In some implementations, data structure 400 may be stored in a memory of cache server 220. In some implementations, data structure 400 may be stored in a memory separate from, but accessible by, cache server 220. In some implementations, data structure 400 may be stored by some other device in environment 200, such as client device 210 and/or origin device 230. A particular instance of data structure 400 may contain different information and/or fields than another instance of data structure 400.

As shown in FIG. 4, data structure 400 may include URI index 410 and RBCI information field 420.

URI index 410 may store information that maps a particular URI to a particular RBCI. For example, URI index 410 may store a URI and an identifier (ID) of an RBCI. As shown in FIG. 4, multiple different URIs (e.g., dynamic URIs) may map to a particular RBCI that may correspond to a particular content file stored by cache server 220. For example, URI 1, URI 2, URI 3, URI 4, and URI 5 may map to RBCI 1.

RBCI information field 420 may store information for a particular RBCI. As shown in FIG. 4, RBCI information field 420 may store an ID of the particular RBCI, a path, pointer, or link, of a content file corresponding to the particular RBCI stored by cache server 220, an expiry timestamp that identifies when the particular RBCI may expire, a list of URIs mapped to the particular RBCI, and response values of the content file corresponding to the particular RBCI.

In some implementations, the response values may include a checksum value, a date and time modified timestamp, a signature, and/or some other value that uniquely identifies the content file. In some implementations, the checksum value may be based on a checksum algorithm (e.g., a message-digest series 5 algorithm (MD5), a secure hash algorithm (SHA) or some other checksum algorithm) and data associated with a portion of the content file. In some implementations, the date and time modified timestamp may identify a date and time at which the content file was modified. In some implementations, the signature may include an etag, a hash value, or some other type of signature that uniquely identifies the content file.

In some implementations, cache server 220 may delete the particular RBCI, the content file corresponding to the RBCI, and the associated URIs from RBCI information field 420 and URI index 410 after the particular RBCI has expired (e.g., as identified by the expiry timestamp). In some implementations, cache server 220 may delete the particular RBCI after the particular RBCI has expired in order to prevent cache server 220 from storing an outdated or stale content file.

In some implementations, cache server 220 may determine that a URI corresponds to a particular RBCI when response values of a content file, associated with the URI, match response values in the particular RBCI. Based on determining that the URI corresponds to the particular RBCI, cache server 220 may store information in URI index 410 and RBCI information field 420 to map the URI to the particular RBCI.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
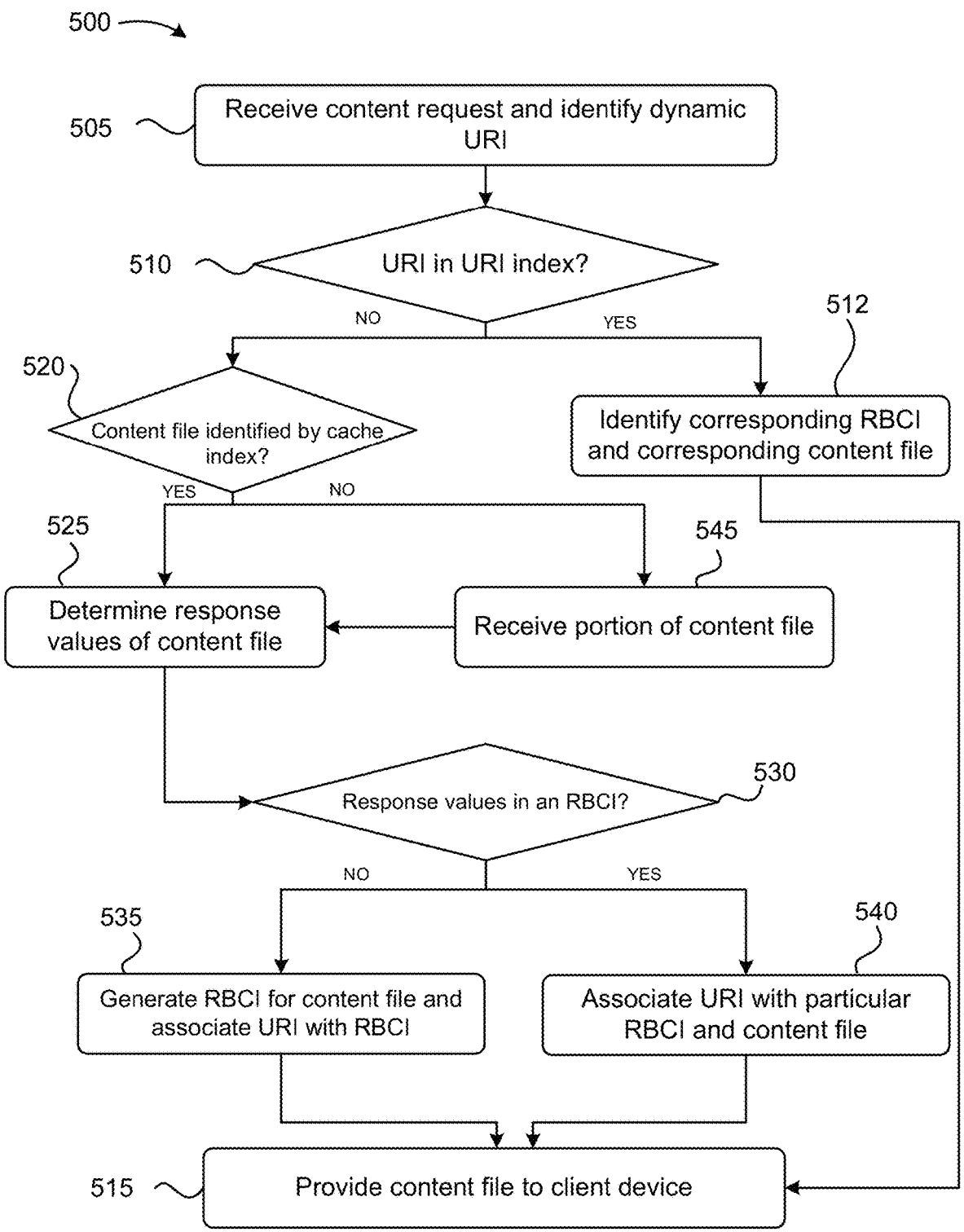
FIG. 5 illustrates a flowchart of an example process for providing, generating, and maintaining a response based cache index.

FIG. 5 illustrates a flowchart of an example process 500 for providing, generating, and maintaining a response based cache index. In one implementation, process 500 may be performed by one or more components of cache server 220. In another implementation, some or all of blocks of process 500 may be performed by one or more components of another device in environment 200 (e.g., client device 210 and/or origin device 230), or a group of devices including or excluding cache server 220.

As shown in FIG. 5, process 500 may include receiving a content request and identifying a dynamic URI (block 510). For example, cache server 220 may receive the content request from client device 210. In some implementations, the content request may include a URI and a request to receive a content file stored by origin device 230. In some implementations, cache server 220 may identify that the URI, included in the content request, includes a dynamic URI based on a format of the URI, a session ID included in the URI, a hash code included in the URI, etc. For example, cache server 220 may determine the format of a dynamic URI based on information, provided by origin device 230, that identifies the format of the dynamic URI.

Process 500 may also include determining whether the URI is included in a URI index (block 520). For example, cache server 220 may determine whether the URI is in the URI index (e.g., a data structure corresponding to URI index 410) by looking up the URI, included in the content request, in URI index 410. In some implementations, cache server 220 may determine that the URI is in the URI index when characters in the URI match characters of URIs stored by URI index 410. As described above, URI index 410 may store information mapping a URI to an RBCI that corresponds to a content file stored by cache server 220.

If, for example, cache server 220 determines that the URI is in the URI index (block 510—YES), process 500 may include identifying a corresponding RBCI and corresponding content file (block 512). For example, cache server 220 may identify a corresponding RBCI based on information stored by URI index field 410. In some implementations, cache server 220 may identify the content file associated with the identified RBCI based on information stored by RBCI information field 420.

Process 500 may further include providing the content file to the client device (block 515). For example, cache server 220 may provide the content file, corresponding to the RBCI mapped to the URI, to client device 210 without communicating with origin device 230 (e.g., since cache server 220 stores the content file).

If, on the other hand, cache server 220 determines that the URI is not in the URI index (block 510—NO), cache server 220 may determine whether the content file is identified in a cache index (block 520). For example, cache server 220 may determine whether the content file, corresponding to the content request, is identified by another cache index other than by an RBCI. In some implementations, cache server 220 may determine one or more request values (e.g., parameters in the content request) that may be used to identify whether the content file is identified in the cache index, and thus stored by cache server 220. For example, based on a non-dynamic portion of the URI (e.g., a portion of the URI that includes a domain name or address of origin device 230), an IP address of client device 210, an identifier of client device 210, and/or some other parameter associated with the content request, cache server 220 may determine whether the content file is identified by the cache index. In some implementations, cache server 220 may determine a cache-hit when the content file is identified by a cache index, and may determine a cache-miss when the content file is not identified by the cache index.

If, for example, cache server 220 determines that the content file is identified by the cache index (block 520—YES), thereby indicating that cache server 220 stores the content file, cache server 220 may determine response values of the content file (block 525). For example, cache server 220 may determine the response values, such as an etag, a checksum value, a response header, an element of metadata, or the like. In some implementations, cache server 220 may identify an etag and/or an element of metadata based on a header associated with the content file. For example, cache server 220 may read the etag or the element of metadata from a field of the header, or may identify the etag or the element of metadata based on some other technique. Additionally, or alternatively, cache server 220 may determine a checksum value based on data associated with a portion of the content file. For example, as described above, cache server 220 may use a checksum algorithm (e.g., an MD5, SHA, and/or some other checksum algorithm) to determine the checksum value of the portion of the content file.

Process 500 may also include determining whether the response values are in an RBCI (block 530). For example, cache server 220 may determine whether the response values, (e.g., determined response values) are in an RBCI of cache server 220 by comparing the determined response values with response values stored by one or more RBCIs stored by cache server 220 (e.g., stored response values). In some implementations, cache server 220 may determine that the response values are in an RBCI when the determined response values match the stored response values.

If, for example, cache server 220 determines that the response values are not in an RBCI (block 530—NO), process 500 may further include generating an RBCI for the content file and associating the URI with the RBCI (block 535). For example, cache server 220 may generate the RBCI, store information identifying the content file in the RBCI, store the URI in a URI list of the RBCI, and store the response values in the RBCI. In some implementations, cache server 220 may generate the RBCI in accordance with a format of RBCI information field 420 or in some other format.

In some implementations, cache server 220 may store the URI and corresponding RBCI in URI index 410 such that when a subsequent content request that includes the URI is received, cache server 220 may identify the URI in URI index field 410, identify the RBCI mapped to the URI, and provide the content file to client device 210 as described above with respect to block 510—YES and block 515.

As further shown in FIG. 5, cache server 220 may provide the content file to client device 210 without communicating with origin device 230 (e.g., since the content file is being stored by cache server 220 as described above with respect to block 520—YES). In some implementations, cache server 220 may provide the content file to client device 210 as described above with respect block 515, based on generating the RBCI and associating the URI with the RBCI.

If, on the other hand, cache server 220 determines that the response values are stored in an RBCI (block 530—YES), process 500 may include associating the URI with a particular RBCI and content file (block 540). For example, cache server 220 may identify the particular RBCI having the determined response values and may store the URI in a URI list of the particular RBCI. Further, cache server 220 may store the URI and the particular RBCI in URI index 410 to map the URI to the particular RBCI such that when a subsequent content request that includes the URI is received, cache server 220 may identify the URI in URI index field 410, identify the particular RBCI mapped to the URI, and provide the content file to client device 210 as described above with respect to block 510—YES and block 515.

As further shown in FIG. 5, cache server 220 may provide the content file to client device 210 as described above with respect block 515, based on associating the URI with the particular RBCI and content file.

In some implementations, cache server 220 may determine that the content file is not identified by a cache index (block 520—NO). Process 500 may include receiving a portion of the content file (block 545). For example, cache server 220 may request the content file from origin device 230 and may receive a response header and the portion of the content file. In some implementations, cache server 220 may determine response values of the content file based on information included in the response header. Additionally, or alternatively, cache server 220 may determine the response values by determining a checksum value, a signature, an etag, and/or some other attribute of the portion of the content file. In some implementations, cache server 220 may determine whether the response values are in an RBCI (block 530). If the response values are not in an RBCI (e.g., indicating that cache server 220 does not store the content file), cache server 220 may receive a remaining portion of the content file from origin device 230, store the content file, and generate an RBCI for the content file in accordance with block 535.

If, on the other hand, the response values are in an RBCI (e.g., indicating that cache server 220 stores the content file), cache server 220 may terminate the communication with origin device 230 (e.g., to save network resources), and associate the URI with the particular RBCI, associated with the response values (block 540), and provide the content file to client device 210 (block 515). As a result, the URI may be mapped to the particular RBCI such that when a subsequent content request including the URI is received, cache server 220 may identify that the URI is in URI index 410 to identify that content file is being stored by cache server 220 and may not need to communicate with origin device 230 to receive the portion of the content file.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6A:
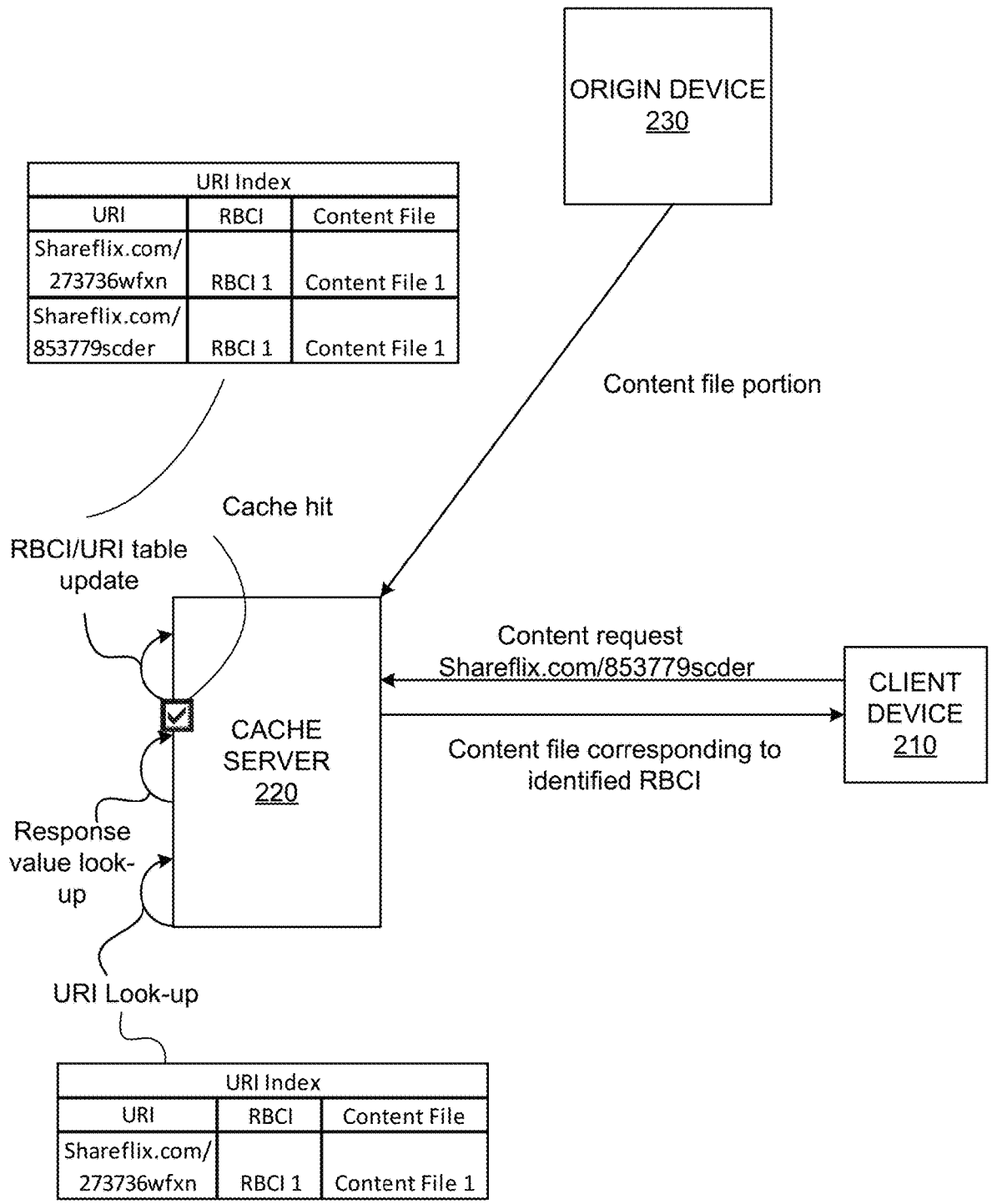
FIGS. 6A-6B illustrate example implementations as described herein.
Figure 6B:
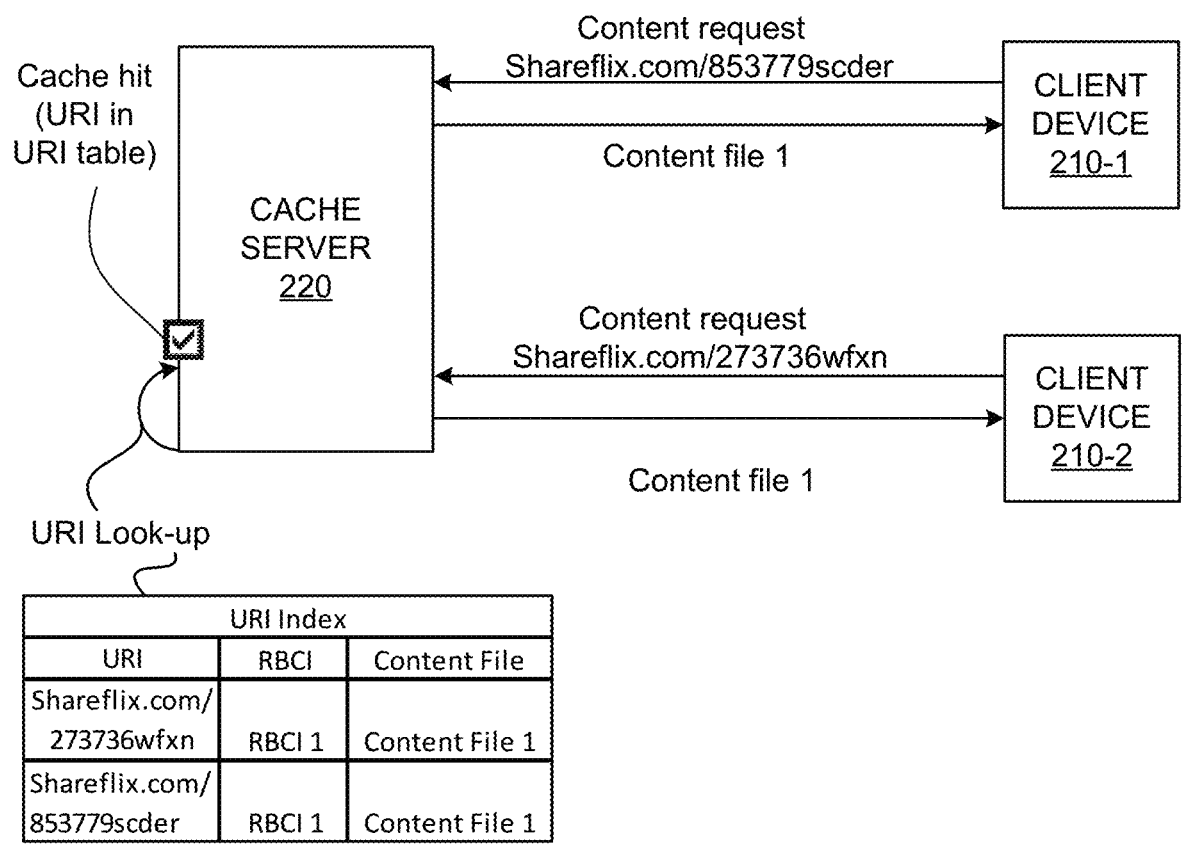

FIGS. 6A-6B illustrate example implementations as described herein. As shown in FIG. 6A, client device 210 may provide a content request including a dynamic URI (e.g., the URI "Shareflix.com/853779scder) and a request for a content file stored by origin device 230. In some implementations, cache server 220 may perform a URI look-up function to identify whether the URI is in a URI index of cache server 220. In FIG. 6A, assume that the URI index includes the URI "Shareflix.com/273736wfxn" but does not include the URI in the content request. Given this assumption, cache server 220 may determine whether the content file is identified in a cache index of cache server 220 (e.g., based on request values of the content request and in accordance with block 520). In FIG. 6A, assume that the content file is not identified by the cache index. Given this assumption, cache server 220 may communicate with origin device 230 to receive a portion of the content file from origin device 230 and determine response values for the portion of the content file (e.g., in accordance with block 525). For example, cache server 220 may receive the portion of the file to determine whether the content file is being stored by cache server 220 (e.g., when the response values of the portion of the content file are in an RBCI) without needing to receive the entire content file, thereby saving network resources.

In some implementations, cache server 220 may determine whether the response values are stored in one or more RBCIs associated with cache server 220. In FIG. 6A, assume that the response values are stored by a particular RBCI associated with cache server 220 (e.g., the RBCI having the ID of RBCI 1). Given this assumption, cache server 220 may terminate the communication with origin device 230, store information in the URI index and in an RBCI list of the particular RBCI, and provide the content file, associated with the particular RBCI, to client device 210. As a result, cache server 220 may receive only a portion of the content file to determine the response values and identify that the content file is being stored by cache server 220. Further, cache server 220 may map the URI to the RBCI and to the content file, such that when a subsequent content request including the URI is received, cache server 220 may identify that the content file is being stored by cache server 220 without communicating with origin device 230. In the example shown in FIG. 6A, after cache server 220 has mapped the URI to the RBCI and the content file, the URI index may store information that maps multiple URIs to the content file (e.g., the URI "Shareflix.com/273736wfxn" and the URI "Shareflix.com/853779scder").

Referring to FIG. 6B, assume that a first client device 210 (e.g., client device 210-1) provides a subsequent content request including the URI "Shareflix.com/853779scder." Since cache server 220 stores the URI in the URI index, cache server 220 may determine a cache-hit and provide the content file to client device 210 without communicating with origin device 230. As further shown in FIG. 6B, assume that a second client device (e.g., client device 210-2) provides a content request including the URI "Shareflix.com/273736wfxn." Given these assumptions, cache server 220 may determine a cache-hit and provide the content file without communicating with origin device 230 and without storing multiple instances of the same content file when multiple URIs are associated with the content file.

While particular examples are shown in FIGS. 6A-6B, the above description is merely an example implementation. In practice, other examples are possible from what is described above with respect to FIGS. 6A-6B.

As described above cache server 220 may store a single instance of a content file when multiple different URIs correspond to the content file. Further, cache server 220 may determine a cache-hit or a cache-miss based on RBCIs that map response values to content files and map multiple different URIs to one set of response values and one content file. In some implementations, cache server 220 may avoid communicating with origin device 230 based on determining a cache-hit. Further, as additional URIs, corresponding to a particular content file, are discovered (e.g., by mapping the URIs to response values for the particular content file), the more likely cache server 220 may determine a cache-hit based on the URI, without storing multiple instances of the particular content file, thereby simplifying the caching of content files and reducing storage consumption in relation to when multiple instances of the particular content file are stored. Further, since a particular URI can be mapped to a particular RBCI (and hence a particular content file,) client device 210 can provide multiple requests using the particular URI (where each request includes the particular URI and a byte range, corresponding to a request for a portion of the content file), such that each portion of the content file does not need an RBCI (since the particular URI maps to the RBCI of the entire content file).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A first device comprising:
one or more memories to store:
a content file corresponding to a dynamic network address,
a first index that includes a plurality of different dynamic network addresses, and
a second index that identifies that the content file is stored by the first device; and
one or more processors to:
receive, from a second device, a content request that includes the dynamic network address and a request for the content file,
determine that the dynamic network address is not included in the plurality of different dynamic network addresses included in the first index,
determine a response value, associated with the content file, without communicating with an origin device to obtain the content file, based on determining that the dynamic network address is not included in the first index,
the response value being a checksum value based on a portion of the content file,
determine that the response value is included in the second index when the response value matches one or more response values included in the second index,
generate an association between the dynamic network address and the second index to map the dynamic network address to the second index and to the content file based on determining that the response value is included in the second index, and
provide the content file to the second device.

2. The first device of claim 1, where the one or more processors are further to:
terminate communication with a third device based on determining that the response value is included in the second index, store information in the first index and in an index list of the second index; and
where, when providing the content file to the second device, the first device is to provide the content file to the second device based on storing the information.

3. The first device of claim 1, where the one or more processors are further to:
receive the portion of the content file.

4. The first device of claim 1, where the one or more processors are further to:
  map the dynamic network address to the second index and to the content file,
  determine that a subsequent content request is received, the subsequent content request including the dynamic network address and being received after the content request, and
  identify that the content file is being stored by the first device without having to receive the portion of the content file from a third device and based on determining that the subsequent content request is received.

5. The first device of claim 1, where the one or more processors are further to:
  store a single instance of the content file when the plurality of different dynamic network addresses correspond to the content file, and
  determine a cache-hit or a cache-miss based on the second index,
    the second index mapping the response value to the content file,
    the second index mapping the plurality of different dynamic network addresses to the response value and the content file.

6. The first device of claim 1, where the one or more processors are further to:
  map a single instance of the content file to the plurality of different dynamic network addresses.

7. The first device of claim 1, where the response value includes at least one of:
  a date and time modified timestamp;
  a signature; or
  an etag.

8. A method comprising:
  storing, by a first device, a content file corresponding to a dynamic network address;
  storing, by the first device, a first index that includes a plurality of different dynamic network addresses;
  storing, by the first device, a second index that identifies that the content file is stored by the first device;
  receiving, by the first device, a content request that includes the dynamic network address and a request for the content file;
  determining, by the first device, that the dynamic network address is not included in the plurality of different dynamic network addresses included in the first index;
  determining, by the first device, a response value, associated with the content file, without communicating with an origin device to obtain the content file, based on determining that the dynamic network address is not included in the first index,
    the response value being a checksum value based on a portion of the content file;
  determining, by the first device, whether the response value is included in the second index based on whether the response value matches one or more response values included in the second index;
  generating, by the first device, an association between the dynamic network address and the second index to map the dynamic network address to the second index and to the content file based on determining that the response value is included in the second index; and
  providing, by the first device, the content file to a second device.

9. The method of claim 8, further comprising:
  receiving a subsequent content request from the second device,
    the subsequent content request including the dynamic network address and being received after the content request; and
  providing the content file to the second device, without having to receive the portion of the content file from a third device, based on receiving the subsequent content request.

10. The method of claim 8, where receiving the content request comprises:
  receiving the content request from the second device; and
  where providing the content file comprises:
  providing the content file without storing a plurality of instances of the content file when the plurality of different dynamic network addresses are associated with the content file.

11. The method of claim 8, further comprising:
  determining that the content file is not identified by the second index;
  communicating with a third device to receive the portion of the content file from the third device based on determining that the content file is not identified by the second index; and
  determining the response value for the portion of the content file.

12. The method of claim 8, further comprising:
  mapping a single instance of the content file to the plurality of different dynamic network addresses.

13. The method of claim 8, where the response value includes at least one of:
  a date and time modified timestamp;
  a signature; or
  an etag.

14. A non-transitory computer-readable medium for storing instructions, the instructions comprising:
  one or more instructions that, when executed by one or more processors associated with a first device, cause the one or more processors to:
    store a content file corresponding to a dynamic network address,
    store a first index that includes a plurality of different dynamic network addresses,
    store a second index that identifies that the content file is stored by the first device,
    receive, from a second device, a content request that includes the dynamic network address and a request for the content file,
    determine whether the dynamic network address is included in the plurality of different dynamic network addresses included in the first index,
    determine a response value, associated with the content file, without communicating with an origin device to obtain the content file, based on determining that the dynamic network address is not included in the first index,
      the response value being a checksum value based on a portion of the content file,
    determine that the response value is included in the second index when the response value matches one or more response values included in the second index,
    generate an association between the dynamic network address and the second index to map the dynamic network address to the second index and to the content file based on determining that the response value is included in the second index, and
    provide the content file to the second device based on determining that the response value is included in the second index or based on determining that the dynamic network address is included the first index.

15. The non-transitory computer-readable medium of claim 14, where the one or more instructions, when executed by the one or more processors, further cause the one or more processors to:
   terminate communication with a third device based on determining that the response value is included in the second index,
   store information in the first index and in an index list of the second index; and
   where one or more instructions, that cause the one or more processors to provide the content file to the second device, cause the one or more processors to provide the content file to the second device based on storing the information.

16. The non-transitory computer-readable medium of claim 15, where the one or more instructions, when executed by the one or more processors, further cause the one or more processors to:
   receive the portion of the content file.

17. The non-transitory computer-readable medium of claim 14, where the one or more instructions, when executed by the one or more processors, further cause the one or more processors to:
   map the dynamic network address to the second index and to the content file,
   determine that a subsequent content request is received,
      the subsequent content request including the dynamic network address and being received after the content request, and
   identify that the content file is being stored by the first device without having to receive the portion of the content file from a third device based on determining that the subsequent content request is received.

18. The non-transitory computer-readable medium of claim 14, where the one or more instructions, when executed by the one or more processors, further cause the one or more processors to:
   store a single instance of the content file when the plurality of different dynamic network addresses correspond to the content file, and
   determine a cache-hit or a cache-miss based on the second index,
      the second index mapping the response value to the content file,
      the second index mapping the plurality of different dynamic network addresses to the response value and the content file.

19. The non-transitory computer-readable medium of claim 14, where the one or more instructions, when executed by the one or more processors, further cause the one or more processors to:
   receive a subsequent content request from the second device,
      the subsequent content request including the dynamic network address and being received after the content request, and
   provide the content file to the second device without having to receive the portion of the content file from a third device.

20. The non-transitory computer-readable medium of claim 14, where the one or more instructions, when executed by the one or more processors, further cause the one or more processors to:
   determine that the content file is not identified by the second index,
   communicate with a third device to receive the portion of the content file from the third device, and
   determine the response value for the portion of the content file.

* * * * *